United States Patent
Shah

(10) Patent No.: US 10,496,424 B2
(45) Date of Patent: *Dec. 3, 2019

(54) RECONFIGURING VIRTUAL MACHINES

(71) Applicant: Red Hat, Inc., Raleigh, NC (US)

(72) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/085,007

(22) Filed: Mar. 30, 2016

(65) Prior Publication Data

US 2016/0210168 A1    Jul. 21, 2016

Related U.S. Application Data

(63) Continuation of application No. 13/483,775, filed on May 30, 2012, now Pat. No. 9,311,119.

(51) Int. Cl.
*G06F 9/455* (2018.01)
*G06F 8/61* (2018.01)
*G06F 8/65* (2018.01)

(52) U.S. Cl.
CPC .......... *G06F 9/45558* (2013.01); *G06F 8/61* (2013.01); *G06F 8/65* (2013.01); *G06F 9/455* (2013.01); *G06F 9/45545* (2013.01); *G06F 2009/45595* (2013.01)

(58) Field of Classification Search
CPC ................................................ G06F 9/45533
USPC .................................................... 718/1
See application file for complete search history.

(56) References Cited

U.S. PATENT DOCUMENTS

| 8,156,492 | B2 * | 4/2012 | Dahlstedt | G06F 9/5016 |
| | | | | 718/1 |
| 8,448,165 | B1 * | 5/2013 | Conover | G06F 9/45558 |
| | | | | 717/174 |
| 8,601,473 | B1 * | 12/2013 | Aron | G06F 9/45533 |
| | | | | 709/223 |
| 8,825,909 | B1 * | 9/2014 | Delco | G06F 9/4411 |
| | | | | 710/10 |
| 2007/0006225 | A1 * | 1/2007 | McAlister | G06F 9/45558 |
| | | | | 718/1 |
| 2007/0079308 | A1 * | 4/2007 | Chiaramonte | G06F 9/5077 |
| | | | | 718/1 |

(Continued)

OTHER PUBLICATIONS

USPTO, Office Action for U.S. Appl. No. 13/483,775, dated Jul. 15, 2014.

(Continued)

*Primary Examiner* — Mehran Kamran
(74) *Attorney, Agent, or Firm* — Lowenstein Sandler LLP

(57) ABSTRACT

Implementations of the disclosure describe reconfiguring virtual machines. In one implementation, a method includes identifying, in view of virtual machine configuration data of a virtual machine, a plurality of virtual hardware components supported by a guest operating system on the virtual machine, identifying, by a processing device executing the virtual machine from the plurality of virtual hardware components, a set of supported virtual hardware components that are not used by the virtual machine, and reconfiguring, by the processing device, the virtual machine to use at least one virtual hardware component from the set of supported virtual hardware components.

19 Claims, 5 Drawing Sheets

(56) References Cited

U.S. PATENT DOCUMENTS

| | | | | |
|---|---|---|---|---|
| 2007/0180447 A1* | 8/2007 | Mazzaferri | G06F 3/1415 | 718/1 |
| 2007/0226449 A1* | 9/2007 | Akimoto | G06F 9/5077 | 711/170 |
| 2008/0134175 A1* | 6/2008 | Fitzgerald | G06F 9/45533 | 718/1 |
| 2008/0271017 A1* | 10/2008 | Herington | G06F 9/45558 | 718/1 |
| 2009/0222880 A1* | 9/2009 | Mayer | G06F 21/6218 | 726/1 |
| 2009/0265707 A1* | 10/2009 | Goodman | G06F 9/5016 | 718/1 |
| 2009/0282404 A1* | 11/2009 | Khandekar | G06F 9/45558 | 718/1 |
| 2009/0300173 A1* | 12/2009 | Bakman | G06F 11/008 | 709/224 |
| 2010/0042988 A1* | 2/2010 | Lundin | G06F 9/45537 | 717/176 |
| 2010/0235831 A1* | 9/2010 | Dittmer | G06F 9/45558 | 718/1 |
| 2010/0306764 A1* | 12/2010 | Khanna | G06F 11/1482 | 718/1 |
| 2011/0022870 A1* | 1/2011 | McGrane | G06F 1/3203 | 713/340 |
| 2011/0023029 A1* | 1/2011 | Diab | G06F 9/5077 | 718/1 |
| 2011/0029970 A1* | 2/2011 | Arasaratnam | G06F 9/45558 | 718/1 |
| 2011/0138383 A1* | 6/2011 | Le | G06F 9/5077 | 718/1 |
| 2011/0154320 A1* | 6/2011 | Verma | G06F 8/63 | 718/1 |
| 2011/0238969 A1* | 9/2011 | Warkentin | G06F 9/441 | 713/2 |
| 2011/0321042 A1* | 12/2011 | Yang | G06F 9/545 | 718/1 |
| 2012/0005676 A1* | 1/2012 | Nakajima | G06F 8/65 | 718/1 |
| 2012/0030669 A1* | 2/2012 | Tsirkin | G06F 9/45533 | 718/1 |
| 2012/0054740 A1* | 3/2012 | Chakraborty | G06F 9/45558 | 718/1 |
| 2012/0124576 A1* | 5/2012 | Chiaramonte | G06F 9/5077 | 718/1 |
| 2012/0154375 A1* | 6/2012 | Zhang | G06F 9/4411 | 345/419 |
| 2012/0291030 A1* | 11/2012 | Fitzgerald | G06F 21/53 | 718/1 |
| 2013/0019015 A1* | 1/2013 | Devarakonda | G06F 9/5072 | 709/226 |
| 2013/0167147 A1* | 6/2013 | Corrie | G06F 9/45533 | 718/1 |
| 2013/0283263 A1* | 10/2013 | Elemary | G06F 9/45558 | 718/1 |
| 2014/0013328 A1* | 1/2014 | Diab | G06F 9/5077 | 718/1 |
| 2014/0047441 A1* | 2/2014 | Miyauchi | G06F 11/2005 | 718/1 |
| 2015/0339157 A1* | 11/2015 | Lent | G06F 17/30197 | 718/1 |

OTHER PUBLICATIONS

USPTO, Final Office Action for U.S. Appl. No. 13/483,775, dated Dec. 18, 2014.
USPTO, Advisory Action for U.S. Appl. No. 13/483,775, dated Mar. 2, 2015.
USPTO, Notice of Allowance for U.S. Appl. No. 13/483,775, dated Dec. 11, 2015.
USPTO, Notice of Allowance for U.S. Appl. No. 13/483,775, dated Jan. 6, 2016.
VMWARE Partner Technology Alliance, "EMC Hybrid Cloud 2.5 With VMWARE, Foundation Infrastructure Solution Guide", https://www.emc.com/collateral/solution-overview/cloud/h13190-emc-hybrid-cloud-foundation-sg.pdf, 152 pages, Sep. 2014.
VMware Workstation 4, "Use an Existing Configuration File and Virtual Disk", https://www.vmware.com/support/ws4/doc/upgrade_3to4_existing.html, 2016, 2 pages.

* cited by examiner

RECONFIGURING VIRTUAL MACHINES

REFERENCE TO RELATED APPLICATION

This application is a continuation of U.S. patent application Ser. No. 13/483,775, filed on May 30, 2012, the entirety of which is incorporated herein by reference.

TECHNICAL FIELD

Embodiments of the present invention relate to a computer system, and more specifically, to virtual machines.

BACKGROUND

A virtual machine (VM) is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer. A host controller (e.g., a server) may manage (e.g., create/remove virtual machines, shut down virtual machines), monitor (e.g., monitor system resources used by hosts and/or virtual machines), configure (e.g., change hardware, software and/or guest operating systems on virtual machines), and/or control the virtual machines.

In a virtualization system, some of the virtual machine hosts, virtual machines, or other components may be changed (e.g., virtual machine components such as virtual hardware, guest operating systems, software and/or drivers installed on a virtual machine, etc.). For example, a guest operating system may be changed (e.g., updated) from one version of the guest operating system (e.g., Fedora 8) to another version of the guest operating system (e.g., Fedora 10). In another example, a guest operating system may be changed from one type of guest operating system (e.g., Windows Vista®) to another type of guest operating system (e.g., Fedora 10). In a further example, virtual hardware (e.g., a motherboard) on a virtual machine may be changed and the new motherboard may support newer, better, and/or more efficient hardware (e.g., faster random access memory (RAM)) and/or new software (e.g., new drivers) may be installed which allow the user of newer, better, and/or more efficient hardware. If a virtual machine component of a virtual machine is changed or added (e.g., a guest operating system is updated or changed), then the virtual machine may not run as optimally or efficiently using the virtual hardware which is currently in use by the virtual machine. In addition, a virtual machine may be created (e.g., instantiated) and configured to use sub-optimal or less efficient virtual hardware (e.g., a system administrator selected sub-optimal or less efficient virtual hardware).

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and method for reconfiguring virtual machines. In one embodiment, a guest agent may reside (e.g., execute) on a virtual machine. The guest agent may provide virtual machine configuration data (e.g., data indicative of the virtual hardware used by the virtual machine, software used by the virtual machine, guest operating system used by the virtual machine, and/or other virtual machine components) to a host controller. In another embodiment, the host controller may obtain the virtual machine configuration data by querying (e.g., polling) the virtual machine, by accessing the virtual machine configuration data in a memory and/or by analyzing a virtual machine. In one embodiment, the host controller may identify a plurality of virtual hardware components which may be supported by the guest operating system, based on the virtual machine configuration data. The host controller may also identify a set of virtual hardware components from the plurality of virtual hardware components that are not currently used by the virtual machine (e.g., are not currently used by the virtual machine) and/or were not previously usable by the virtual machine. The host controller may reconfigure the virtual machine to use one or more virtual hardware components from the set of the plurality of virtual hardware components.

In one embodiment, the host controller may reconfigure the virtual machine to use one or more virtual hardware components from the set of the plurality of virtual hardware components without user input (e.g., may automatically selected and/or virtual hardware components from the set of virtual hardware components). In another embodiment, the host controller may provide data indicative of the set of virtual hardware components (e.g., a list), may receive user input from a user indicating one or more virtual hardware components, and may reconfigure the virtual machine based on the user input.

With certain embodiments of the present invention, a host controller may identify faster, more efficient and/or more optimal virtual hardware which a virtual machine may be able to use. For example, the host controller may identify a new network interface card or a new hard drive controller which a virtual machine may be able to use, after the virtual machine's guest operating system is updated. In another example, a virtual machine may be created or instantiated with slower, sub-optimal, and/or inefficient virtual hardware components and the host controller may be able to identify faster, more efficient and/or more optimal virtual hardware components.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
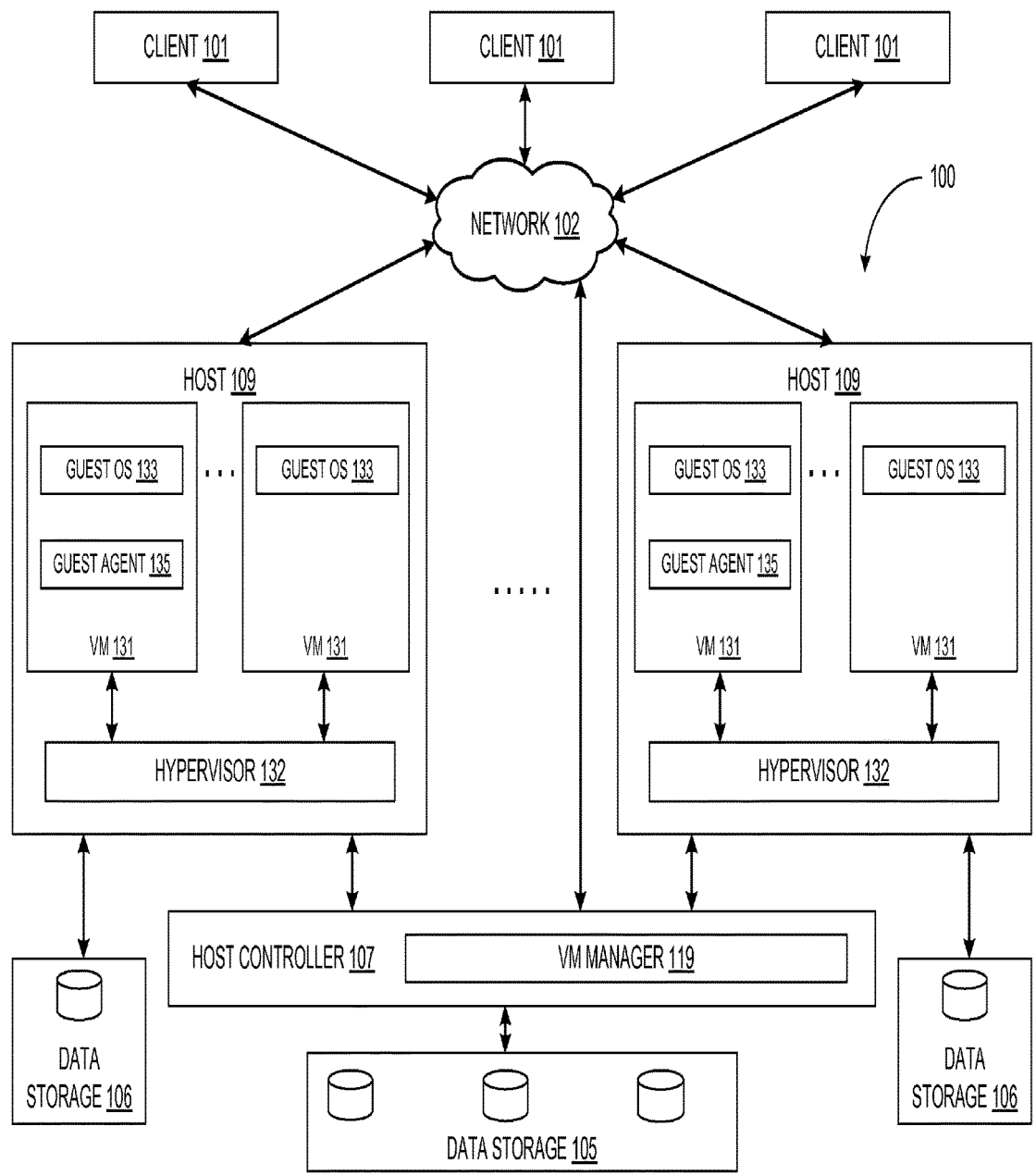
FIG. 1 is a block diagram of an exemplary network architecture in which embodiments of the invention may operate.

FIG. 1 illustrates an exemplary network architecture 100 in which embodiments of the present invention may operate. The network architecture 100 includes hosts 109 coupled to clients 101 over a network 102. The hosts 109 may be a personal computer (PC), a server computer, a personal digital assistant (PDA), a smart phone, a laptop computer, a tablet computer, or any machine capable of executing a set of instructions (sequential or otherwise) that specify actions to be taken by that machine. The network 102 may be a private network (e.g., a local area network (LAN), a wide area network (WAN), intranet, etc.) or a public network (e.g., the Internet). The hosts 109 are also coupled to data storages 106. The data storages 106 may includes one ore more mass storage devices (e.g., disks, flash drives, etc.) to store data generated and/or used by the hosts 109.

Each host 109 may host one or more virtual machines 131. Each virtual machine 131 includes a guest operating system (guest OS) 133 that may be different from one virtual machine to another. The guest OS 133 may include Microsoft Windows®, Linux®, Solaris®, Mac® OS, Fedora, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 may be part of a host operating system.

The clients 101 may include computing devices that have a wide range of processing capabilities such as PCs, PDAs, smart phones, laptop computers, etc. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 may be managed by a host controller 107. The host controller 107 may be a computer coupled to the hosts 109 directly or via the network 102. The host controller 107 may also be in communication with the clients 101, via the network 102. Alternatively, the host controller 107 may be part of one of the hosts 109. In one embodiment, the host controller may include a VM manager 119. The VM manager 119 may add, remove, configure and/or modify the VMs 131 and/or the hosts 109. For example, VM manager 119 may add a new VM, remove an existing VM, change or reconfigure a VM (e.g., add/remove/replace virtual hardware), power on/off the hosts 109, provide directory service to the virtual machines 131, and perform other managerial functions. The host controller 107 may also have access to the data storage 105 to store and/or retrieve data. The data storage 105 may include one or more mass storage devices (e.g., disks, flash drives, etc.).

Some of the virtual machines 131 may also include a guest agent 135. In one embodiment, the guest agent 135 may monitor one or more virtual machine components (e.g., virtual hardware, software, guest operating systems, drivers, etc.) of the virtual machine 131. For example, the guest agent 135 may monitor the different virtual hardware components used by the virtual machine 131. In another example, the guest agent 135 may monitor the software used (e.g., installed or executing) on the virtual machine 131. In a further example, the guest agent 135 may monitor the guest OS 135. In one embodiment, the guest agent 135 may provide virtual machine configuration data (e.g., data indicative of the guest OS, virtual hardware components, software, updates or changes to the software or guest OS, and/or other virtual machine components), to the VM manager 119, when the guest agent 135 detects a change in the virtual machine (e.g., detects that a guest OS has been updated or changed). In one embodiment, the guest agent 135 may receive data indicative of changes on the VM 131 (e.g., changes in the guest OS, virtual hardware, or software) from a package management module (e.g., a module or application which installs software, drivers, operating systems, and/or operating system modules/components on a machine or VM, such as the Yellowdog Updater Modified (YUM) application). In another embodiment, the guest agent 135 may periodically provide virtual machine configuration data to the VM manager 119. In a further embodiment, the guest agent 135 may provide virtual machine configuration data to the VM manager 119 when the guest agent 135 receives a request or a query for the virtual machine configuration data from the VM manager 119.

In one embodiment, the guest agent 135 may update and/or reconfigure a VM 131. For example, the guest agent 135 may add and/or change one or more virtual hardware components (e.g., disk drives, network interface cards, disk controllers, memory, video cards, sound cards, etc) based on data received from the VM manger 119 (e.g., based on data indicative of one or more virtual hardware components to add and/or update, received from the VM manager 119). In one embodiment, the guest agent 135 may prompt a user for user input and may add and/or change one or more virtual hardware components based on the user input (e.g., based on user input indicating that a user, such as an administrator, wants the virtual hardware components to be added and/or changed). In another embodiment, the guest agent 135 may add and/or change virtual hardware components without prompting a user for user input (e.g., automatically). In a further embodiment, the guest agent 135 may provide an indication to a user that one or more virtual hardware components on a VM 131 have been added and/or changed (e.g., may provide a list of virtual hardware components that were added and/or changed).

According to one embodiment of the present invention, the host controller 107 includes a VM manager 119 to monitor, configure, and/or manage the virtual machines 131. The VM manager 119 may obtain virtual machine configuration data for one or more virtual machines. Virtual machine configuration data may include, but is not limited to, information about a guest OS 133, information about an upgrade or change to a guest OS 133, information about software installed and/or executing on the VMs 131, information about upgrades, changes, and/or new installations of software, information about virtual hardware components used by the VMs 131, and/or any information associated with virtual hardware or software on the VMs 131.

In one embodiment, the VM manager 119 may query one or more guest agents 135 to obtain the virtual machine configuration data. For example, the VM manager 119 may request virtual machine configuration data from a guest agent 135. In another embodiment, the VM manager 119 may receive the virtual machine configuration data from one or more guest agents 135. For example, a guest agent 135 may periodically send virtual machine configuration data to the VM manager 119, or the guest agent 135 may send virtual machine configuration data when the guest agent 135 detects a change in virtual machine components on the VM 131.

In one embodiment, the VM manger 119 may analyze a VM 131 to obtain the virtual machine configuration data. For example, a VM 131 may not have a guest agent 135 (e.g., a guest agent 135 may not be installed on a VM 131). The VM manager 119 may analyze a VM 131 on a host 109 and obtain the virtual machine configuration directly. For example, the VM manager 119 may use a module, or tool to analyze a VM 131 and determine the guest OS used by the VM 131 (e.g., software modules such as "libguestfs" and/or "guestfish"), the virtual hardware components installed on the VM 131, and/or the software installed on the VM 131.

In one embodiment, the VM manager 119 may reconfigure (e.g., add and/or change virtual hardware components) a VM 131, based on the virtual machine configuration data obtained for the VM 131. For example, a VM 131 may use the Fedora 8 operating system (e.g., the guest OS 133 on the VM 131 may be Fedora version 8). The VM 131 may use an emulated network interface card (e.g., an Intel e1000 network interface card) and may use an integrated drive electronics (IDE) disk controller. A user may change the VM 131 to use the Fedora 10 operating system (e.g., upgrade the guest OS 133 to Fedora version 10). In another example, one or more virtual hardware components, such as a virtual motherboard, on a VM 131 may, and the new virtual motherboard may be able to use (e.g., may support) a new hard disk controller (e.g., the new virtual motherboard may support serial AT attachment (SATA) controllers versus integrated drive electronics (IDE) controllers on the older virtual motherboard). As discussed above, the guest agent 135 may send virtual machine configuration data (e.g., data indicating that the guest OS 133 has been upgraded to Fedora 10) to the VM manager 119, or the VM manager 119 may analyze the VM 131 and may obtain virtual machine configuration data indicating that the guest OS 133 has been changed.

In one embodiment, based on this virtual machine configuration data, the VM manager 119 may identify a plurality of virtual hardware components which is supported by the guest OS 133 (e.g., supported by Fedora 10). For example, the VM manager 119 may access data and/or a database which includes information about different operating systems and different hardware (e.g., virtual hardware) supported by the different operating systems. The VM manager 119 may identify the plurality of virtual hardware components supported by the updated guest OS 133 (e.g., Fedora 10), using the data and/or database. In one embodiment, the VM manager 119 may identify a set of virtual hardware components from the plurality of virtual hardware components which are not currently used by the VM 131. In one embodiment, the set of virtual hardware components may include virtual hardware components which may be newer, faster, more efficient, more optimized, and/or better suited for use on a virtual machine. In another embodiment, the set of virtual hardware components may include virtual hardware components which were not previously usable by the virtual machine (e.g., were not previously supported). For example, Fedora 8 may not support the use of a new virtual network interface card. However, after Fedora 10 is installed on the virtual machine, the new virtual network interface card may now be used on the virtual machine (e.g., is supported by the new guest operating system). The new virtual network interface card may be included in the set of virtual hardware components.

In one embodiment, the VM manager 119 may add one or more virtual hardware components from the set of virtual hardware components to the VM 131 and/or may change a virtual hardware component currently used by the VM 131, to a virtual hardware component from the set of virtual hardware components. For example, the VM manager 119 may change a network interface card from an Intel e1000 network interface card, to a virtio or paravirtualized network interface card (e.g., a virtual hardware component which is aware of the hypervisor 132 and/or may be able to communicate with the hypervisor 132). In another example, the VM may change an IDE disk controller to a virtio or paravirtualized disk controller. As discussed above, the VM manager 119 may prompt a user for user input (e.g., prompt a user such as an administrator for confirmation) before reconfiguring the VM 131 (e.g., before add and/or changing virtual hardware components on the VM 131) or the VM manager 119 may reconfigure the VM 131 without user input (e.g., automatically). In one embodiment, the VM manager 119 may instruct the guest agent 135 to reconfigure the VM 131 (e.g., reconfigure software and/or drivers on the VM 131), instead of reconfiguring the VM itself. In another embodiment, the guest agent 135 may display a list of virtual hardware components which have been changed by the VM manager 119, to a user (e.g., a user of the virtual machine).

In one embodiment, the VM manager 119 and the guest agent 135 may communicate with hypervisor 132 using a virtio-serial mechanism, which can be defined as a mechanism for communication in a virtualization system via multiple generic channels of a paravirtualized device. More specifically, it can provide a transport mechanism in a host machine for communication between the host userspace and/or kernelspace and the VM userspace and/or kernelspace. This transport mechanism may be a communication channel between the host machine and the VM with support for multiple ports, where stream input/output (I/O) is provided on each port. The transport mechanism may have two parts: (1) device emulation in the hypervisor that presents a device to the VM, and (2) a VM device driver that presents an interface to userspace or kernelspace applications on the VM in order to communicate with the hypervisor, to programs external to the hypervisor, and/or with other VMs. The communication channel may be virtio-based, where virtio is an abstraction over a native bus for an architecture so that virtio-based devices can be used for VM-host paravirtual communication, irrespective of the architecture of the VM or the host. For example, virtio is emulated on top of PCI on x86, whereas it uses a native bus on the s390 architecture. Alternatively, the VM manager 119 and the guest agent 135 may communicate using any other communication mechanism allowing exchange of messages between a virtual machine and a host controller. In one embodiment, the guest agent 135 may communicate directly with the VM manager 119. In another embodiment, the guest agent 135 may communicate with the VM manager 119 via the hypervisor 132.

In one example, a virtual machine may be using a Windows® operating system (e.g., Windows XP®). The Windows® operating system may not include virtio device drivers when the operating system is installed. At a later time, the virtio device drivers may be installed on the virtual machine (e.g., may be installed by a system administrator, or may be part of a patch update to the operating system). The guest agent 135 may detect that the new drivers have been installed, and that the Windows® operating system is now capable of supporting virtio devices. The guest agent 135 may provide virtual machine configuration data indicating that new drivers have been installed and/or the VM manager 119 may obtain the virtual machine configuration data from the guest agent 135. Based on the virtual machine configuration data, the VM manger may reconfigure the virtual machine to use one or more virtio devices (e.g., a virtio network interface card or a virtio disk controller).

Figure 2:
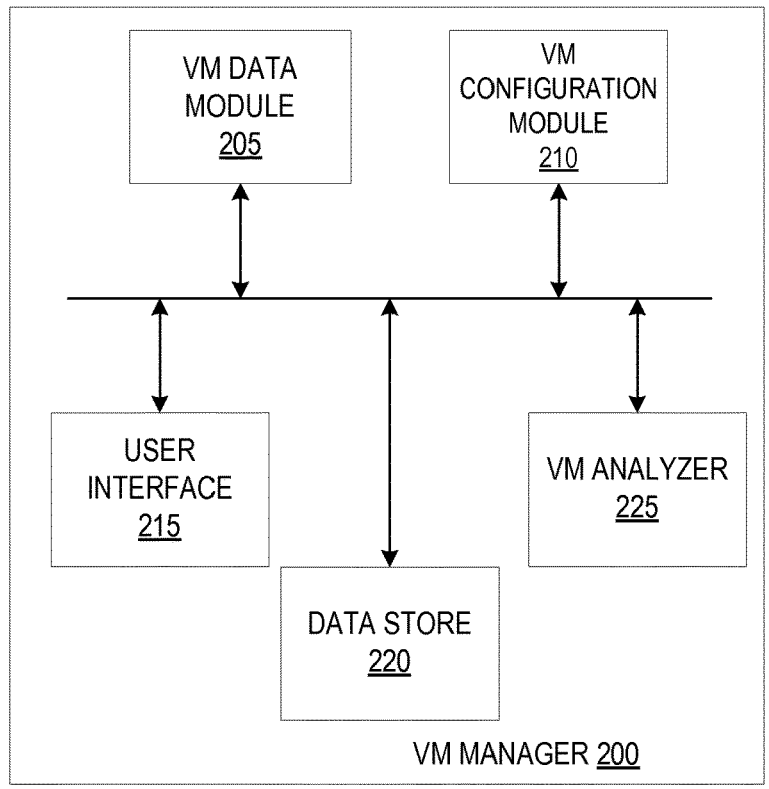
FIG. 2 illustrates a block diagram of an embodiment of a VM manager.

FIG. 2 illustrates a block diagram of an embodiment of the VM manager 200 in the host controller 107. The VM manager 200 may include a VM data module 205, a VM configuration module 210, a user interface 215, a data store 220, and a VM analyzer 225, which are all associated with each other. More or less components may be included in the VM manager 200 without loss of generality.

In one embodiment, the data store 220 may include data or information about different types of operating systems and different types of hardware components (e.g., different types of virtual hardware components) supported by the different types of operating systems. For example, the data store 220 may include a list of all the hardware components (e.g., sound cards, video cards, input/output devices such as mice or keyboards, disk drives, disk controllers, network interface cards, memory, processing devices, universal serial bus (USB) devices, etc.) which are supported by Fedora 10. In another example, the data store 220 may include a list of all the hardware components which are supported by different Windows® operating systems. The data store 220 may be one or more of a database, a hard disk, an optical disk, flash memory, random access memory (RAM), or any other device capable of storing data. Although the data store 220 is shown as part of the VM manager 200, in other embodiments, the data store may be separate from the VM manager 200. For example, the data store 220 may be stored on the data storage 106, shown in FIG. 1.

In one embodiment, the VM data module 205 may obtain virtual machine configuration data (e.g., data indicative of a guest OS used by a VM, virtual hardware components used by a VM, software used by a VM, and/or any updates or changes to the guest OS or software used by the VM) for one or more virtual machines. As discussed above, the VM data module 205 may obtain the virtual machine configuration data from a guest agent on the virtual machine when the virtual machine is changed (e.g., new software is installed on the virtual machine or a guest OS on the virtual machine is updated/modified). For example, if a new guest OS is installed, or a patch to the current guest OS is installed, the guest agent may send virtual machine configuration data indicating that the virtual machine has been changed (e.g., indicating that a patch or a new guest OS has been installed).

In one embodiment, the VM data module 205 may also obtain virtual machine configuration data from a guest agent when the guest agent periodically sends the virtual machine configuration data to the VM manager 119. For example, the guest agent may periodically send (e.g., send every 1 minute, every 5 minutes, every hour, etc.) virtual machine configuration data which includes information about the current guest OS used by the virtual machine, the current virtual hardware components used by the virtual machine, the current software used by the virtual machine etc. In another embodiment, the VM data module 205 may periodically query one or more guest agents for virtual machine configuration data (e.g., the VM data module 205 may query a guest agent every 1 minute, 1 hour, 1 day, etc.) for virtual machine configuration data.

In one embodiment, the VM analyzer 225 may analyze a virtual machine to obtain virtual machine configuration data for the virtual machine. For example, if the virtual machine does not have a guest agent installed or executing on the virtual machine. The VM analyzer 225 may identify the guest OS used by the virtual machine (e.g., identify the type, the version, and any patch information), identify virtual hardware components used by the virtual machine, and/or identify software installed on the virtual machine. In another example, the guest agent on a virtual machine may provide an indication (e.g., send a message) that the virtual machine has changed, to the VM manager 119, and the VM analyzer 225 may analyze the virtual machine in response to the indication. In another embodiment, the VM analyzer 225 may periodically analyze a virtual machine to obtain virtual machine configuration data for the virtual machine (e.g., may analyze a virtual machine every 1 minute, 1 day, 2 days, etc.).

In one embodiment, the VM configuration module 210 may reconfigure a virtual machine based on virtual machine configuration data. The VM configuration module 210 may identify a plurality of virtual hardware components supported by a guest operating system, based on the virtual machine configuration data. For example, the virtual machine configuration data may indicate that a virtual machine is using the Fedora 10 operating system as a guest operating system. The VM configuration module 210 may identify or obtain a list of hardware components (e.g., network interface cards, disk controllers, sound cards, video cards, etc.) which are supported by the Fedora 10 operating system. The VM configuration module 210 may also identify a set of virtual hardware components which are not currently used by the virtual machine and/or were not previously usable by the virtual machine, from the plurality of virtual hardware components. For example, the VM configuration module 210 may identify virtual hardware components which may be faster, more efficient, more optimized, and/or better suited for the virtual machine, from the plurality of virtual hardware components. The VM configuration module 210 may also reconfigure the virtual machine using one or more virtual hardware components from the set of virtual hardware components. For example, the VM configuration module 210 may communicate with a hypervisor for the virtual machine to reconfigure (e.g., add and/or change virtual hardware components) on the virtual machine. In another example, the VM configuration module 210 may update configuration files for the virtual machines in order to reconfigure (e.g., add and/or change virtual hardware components) the virtual machine. In a further example, the VM configuration module 210 may provide instructions, a message, data, and/or other information (e.g., a list of virtual hardware components to add or change) to a guest agent on the virtual machine, and the guest agent may reconfigure the virtual machine (e.g., add or change virtual hardware components) based on the instructions, message data, and/or other information.

In one embodiment, the VM configuration module 210 may restart a virtual machine after the virtual machine has been reconfigured. For example, the VM configuration module 210 may update the disk controller for a virtual machine from an IDE disk controller to a virtio disk controller (e.g., a virt-blk (virtio block disk) or a virt-scsi (virtio small computing system interface) controller). The reconfiguration of the virtual machine (e.g., update the disk controller for the virtual machine) may require a restart or reboot of the virtual machine in order for the new or update virtual machine components to take affect (e.g., to be properly used by the virtual machine). For example, the VM configuration module 210 may signal (e.g., may send a message to) a guest agent on the virtual machine to reboot the virtual machine. The guest agent may display a prompt to a user informing the user that virtual hardware on the virtual machine has been changed and that the new hardware will take affect (e.g., will be used by the virtual machine) after the virtual machine is rebooted. The user may select to reboot the virtual machine or to postpone the reboot until a later time.

The user interface 215 may facilitate the reconfiguration of the virtual machines. For example, the user interface 215 may be presented to a user (e.g., a system administrator) to provide a list of virtual hardware components which may be added and/or updated on a virtual machine. The user interface 215 may also prompt a user for user input indicating one or more of the virtual machine components from the list of virtual hardware components and/or confirming that the virtual machine should be reconfigured to use one or more of the virtual machine components. Based on the user input received by the user interface 215, the VM manager 119 may reconfigure one or more virtual machines.

Figure 3:
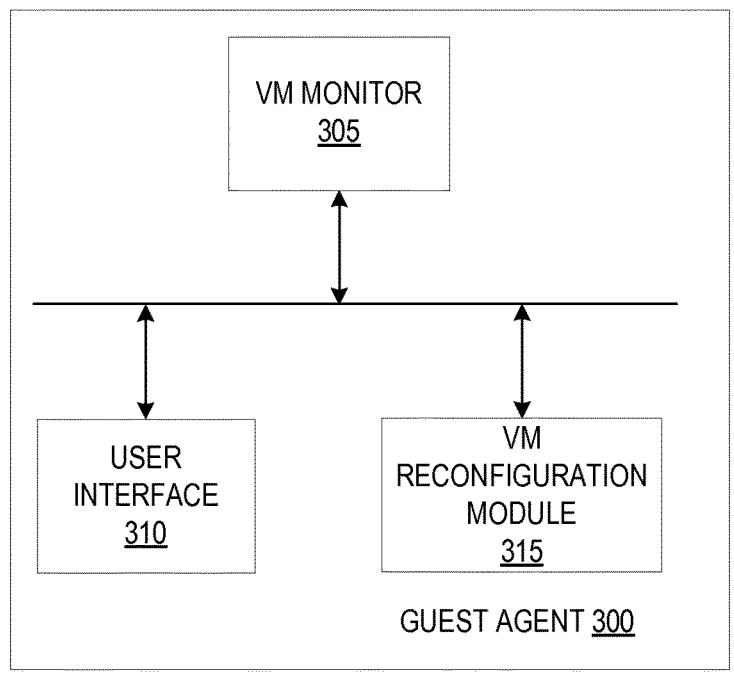
FIG. 3 is illustrates a block diagram of an embodiment of a guest agent.

FIG. 3 illustrates a block diagram of an embodiment of the guest agent 300. The guest agent 300 may include a VM monitor 305, a user interface 310, and a VM reconfiguration manager 315, which are associated with each other. More or less components may be included in the guest agent 300 without loss of generality.

In one embodiment, the VM monitor 305 may monitor a virtual machine to determine when the virtual machine is changed (e.g., when a guest OS is updated, a new guest OS is installed, new software or virtual hardware is installed, etc.). The VM monitor 305 may provide data indicative of the changes in the virtual machine (e.g., virtual machine configuration data), to a VM manager (e.g., VM manager 119), as discussed above. In another embodiment, the VM monitor 305 may periodically analyze (e.g., once every 1 minute, 1 hour, 1 day, etc.) a virtual machine to obtain the virtual machine configuration data (e.g., current guest OS used by the virtual machine, current virtual hardware components used by the virtual machine, current software used by the virtual machine etc.). The VM monitor 305 may also periodically provide the virtual machine configuration data to the VM manager. In a further embodiment, the VM monitory 305 may analyze a virtual machine and obtain virtual machine configuration data for the virtual machine in response to a request for the virtual machine configuration data is received from the VM manager.

In one embodiment, the VM reconfiguration manager 315 may reconfigure a virtual machine based on a message, an instruction, an indication, or other data, received from the VM manager. For example, the VM reconfiguration manager 315 may receive a list of virtual hardware components to add and/or update in the virtual machine, from the VM manager. The VM reconfiguration manager 315 may reconfigure the virtual machine to use one or more of the virtual hardware components in the list. In one embodiment, the VM reconfiguration manager 315 may automatically reconfigure the virtual machine. In another embodiment, the VM reconfiguration manager 315 may prompt a user for user input and may reconfigure the virtual machine based on the user input (e.g., based on virtual hardware components selected by a user and/or based on confirmation from the user). In one embodiment, the VM reconfiguration manager 315 may restart a virtual machine after the virtual machine has been reconfigured. For example, one or more of the virtual hardware components added and/or update on the virtual machine may require that the virtual machine be restarted or rebooted. In one embodiment, the VM reconfiguration manager 315 may provide a prompt (e.g., a graphical user interface) to a user indicating that virtual hardware (e.g., one or more virtual hardware components) on the virtual machine have changed and that the changes will take affect after the virtual machine reboots. The user may indicate that the virtual machine should be rebooted immediately or that the virtual machine should be rebooted at a later time.

The user interface 310 may facilitate the reconfiguration of the virtual machines. For example, the user interface 310 may be presented to a user (e.g., a system administrator) to provide a list of virtual hardware components which may be added and/or updated on a virtual machine. The user interface 310 may also prompt a user for user input indicating one or more of the virtual hardware components from the list of virtual hardware components and/or confirming that the virtual machine should be reconfigured to use one or more of the virtual hardware components. Based on the user input received by the user interface 310, the guest agent 300 may reconfigure one or more virtual machines.

Figure 4:
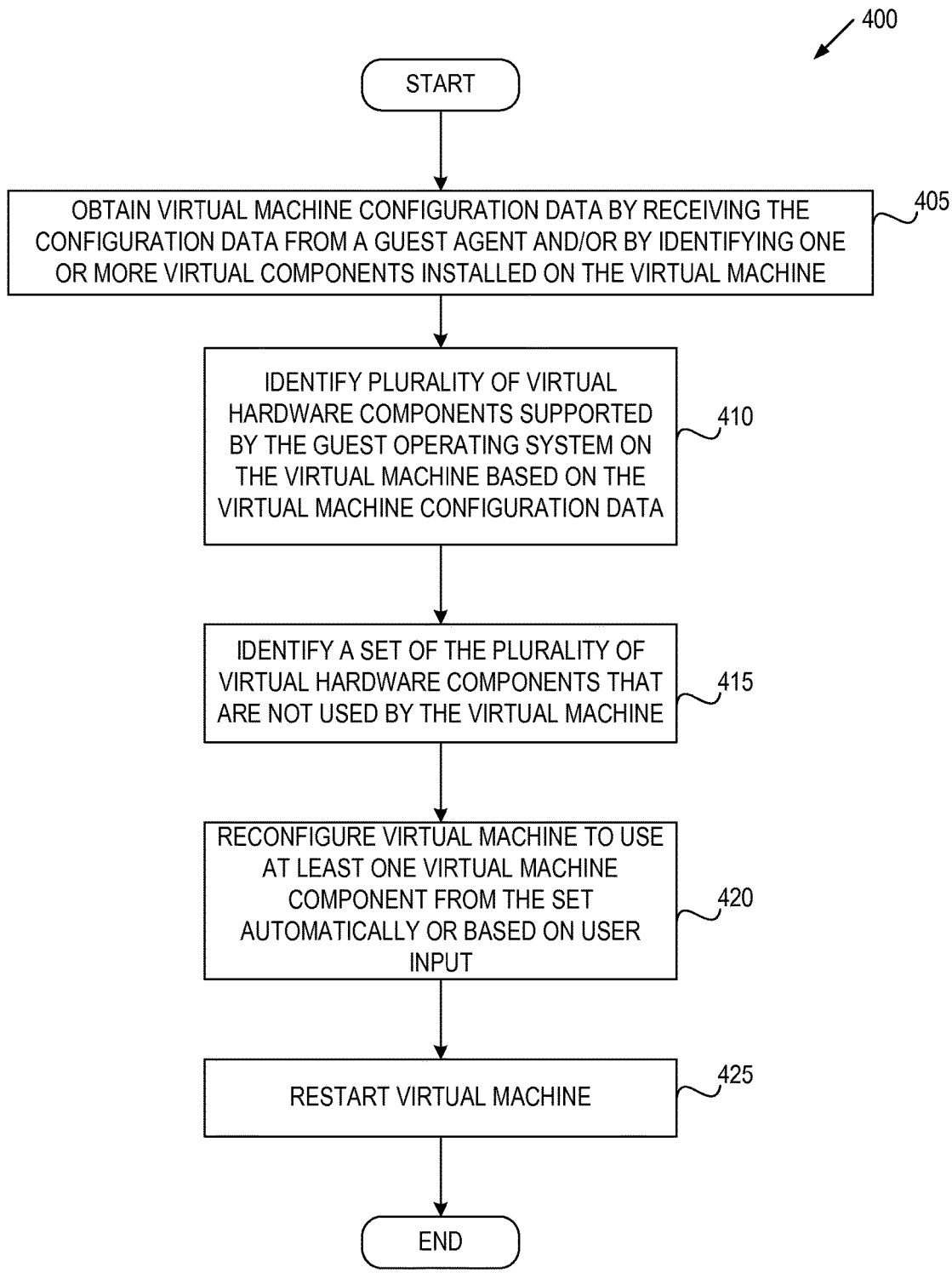
FIG. 4 is a flow diagram illustrating a method of reconfiguration a virtual machine, according to one embodiment.

FIG. 4 is a flow diagram illustrating a method 400 of tuning a guest operating system, according to one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 may be performed by a host controller (e.g., the host controller 107 of FIG. 1).

Referring to FIG. 4, the method 400 starts with the host controller obtaining virtual machine configuration data for a virtual machine (block 405). For example, as discussed above, the host controller may obtain the virtual machine configuration data from a guest agent periodically or when the guest agent detects a change in the virtual machine (e.g., detects that the guest OS has been updated or a new guest OS has been installed). In another example, as discussed above, the host controller may analyze the virtual machine and identify one or more virtual components (e.g., virtual hardware, software, drivers, etc.) on the virtual machine, to obtain the virtual machine configuration data. At block 410, the host controller may identify a plurality of virtual hardware components supported by the guest operating system on the virtual machine based on the virtual machine configuration data. For example, as discussed above, the host controller may determine the type and/or version of the guest operating system used by the virtual machine, and may identify the plurality of virtual hardware components supported by the guest operating system, using a database.

The host controller may identify a set (or subset) of the plurality of virtual hardware components which are currently not used by the virtual machine at block 415. As discussed above, the set of virtual hardware components may be hardware components which are supported but not currently used by the virtual machine. The set of virtual hardware components may include virtual hardware components which may be newer, faster, more efficient, more optimized, and/or better suited for use on a virtual machine. Also as discussed above, the set of virtual hardware components may be components which were previously unusable by the virtual machine. At block 420, the host controller reconfigures the virtual machine to use at least one virtual hardware component from the identified set of virtual hardware components. As discussed above, the host controller may automatically reconfigure the virtual machine or prompt a user for user input and reconfigure the virtual machine based on the user input. At block 425, the host controller may optionally reboot or restart the virtual machine. It should be noted that in some embodiments, the host controller may not perform block 425 (e.g., may not reboot the virtual machine). For example, a new virtual hardware component installed on a virtual machine may not require a reboot in order for the virtual machine to use the new virtual hardware component.

Figure 5:
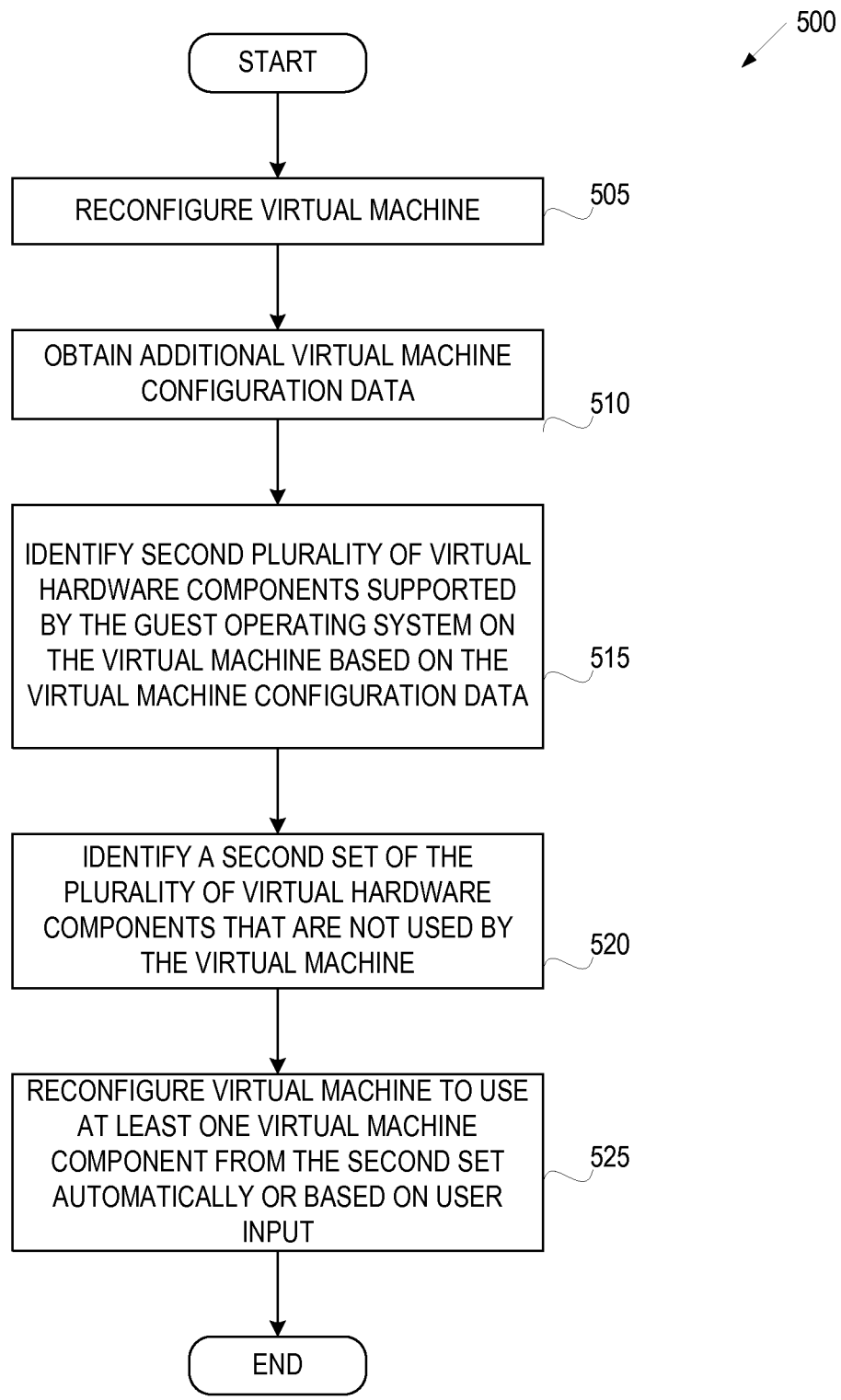
FIG. 5 is a flow diagram illustrating a method of reconfiguration a virtual machine, according to another embodiment.

FIG. 5 is a flow diagram illustrating a method 500 of tuning a guest operating system, according to one embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 may be performed by a host controller (e.g., the host controller 107 of FIG. 1).

Referring to FIG. 5, the method 500 starts with the host controller reconfiguring a virtual machine (block 505). The virtual machine may be reconfigured according to the method 400 shown in FIG. 4. At block 510, the host controller obtains additional virtual machine configuration data for a virtual machine. The host controller may identify a second plurality of virtual hardware components supported by the guest operating system on the virtual machine based on the virtual machine configuration data at block 515. At block 520, the host controller may identify a second set (or second subset) of the second plurality of virtual hardware components which are currently not used by the virtual machine. As discussed above, the set of virtual hardware components may be hardware components which are supported but not currently used by the virtual machine. The set of virtual hardware components may include virtual hardware components which may be newer, faster, more efficient, more optimized, and/or better suited for use on a virtual machine. Also as discussed above, the set of virtual hardware components may be components which were previously unusable by the virtual machine. At block 525, the host controller reconfigures the virtual machine to use at least one virtual hardware component from the second set of virtual hardware components. As discussed above, the host controller may automatically reconfigure the virtual machine or prompt a user for user input and reconfigure the virtual machine based on the user input.

Figure 6:
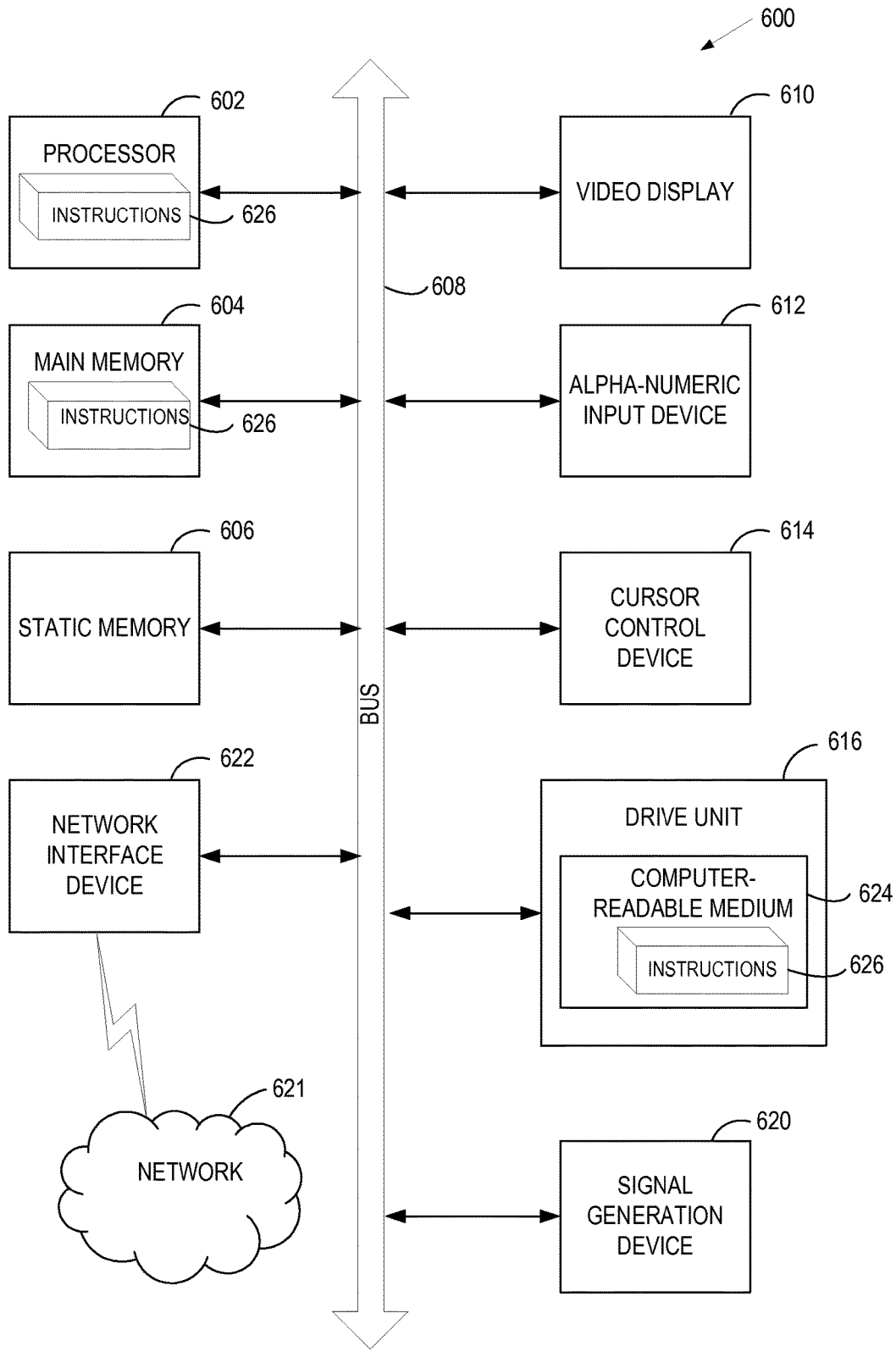
FIG. 6 illustrates a diagrammatic representation of a machine in the exemplary form of a computer system, in accordance with one embodiment.

FIG. 6 illustrates a diagrammatic representation of a machine in the exemplary form of a computer system 600, in accordance with one embodiment, within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 of VM manager 119 and/or the guest agent 135 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions 626 of the VM manager 119 and/or the guest agent 135) embodying any one or more of the methodologies or functions described herein. The instructions 626 of the VM manager 119 and/or the guest agent 135 may also reside, completely or at least partially, within the main memory 604 and/or within the processor 602 during execution thereof by the computer system 600, the main memory 604 and the processor 602 also constituting computer-readable media. The instructions 626 of the VM manager 119 and/or the guest agent 135 may further be transmitted or received over a network 621 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "identifying", "obtaining", "transmitting", "receiving", "reconfiguring", "displaying", "providing", "setting", "updating", "storing", "updating", "adding", "selecting", "changing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    identifying, in view of virtual machine configuration data of a virtual machine, a plurality of virtual hardware components supported by a guest operating system on the virtual machine;
    identifying, by a processing device of a virtual machine manager of a host controller, from the plurality of virtual hardware components, a set of supported virtual hardware components that were previously not used by the virtual machine;
    generating, by the processing device of the virtual machine manager of the host controller, a user interface comprising the set of supported virtual hardware components that are not used by the virtual machine;
    receiving, by the processing device via the user interface, a selection of at least one virtual hardware component from the set of supported virtual hardware components to be initialized on the virtual machine; and
    providing, by the virtual machine manager, an instruction to a hypervisor executing the virtual machine to cause the hypervisor to reconfigure the virtual machine by changing a virtual hardware component currently used by the virtual machine to the selected at least one virtual hardware component.

2. The method of claim 1, wherein the virtual machine configuration data is obtained by identifying one or more virtual machine components installed on the virtual machine.

3. The method of claim 1, wherein the virtual machine configuration data comprises one or more of:
    data indicative of an installation of a new guest operating system; data indicative of an update to the guest operating system;
    data indicative of an installation of a new software component on the virtual machine; data indicative of an upgrade of an existing software component installed on the virtual machine; or
    data indicative of one or more virtual hardware components installed on the virtual machine.

4. The method of claim 1, further comprising:
    providing data indicative of the set of supported virtual hardware components to a user; and
    receiving user input indicating the at least one virtual hardware component.

5. The method of claim 1, further comprising:
    obtaining additional virtual machine configuration data for the virtual machine;
    identifying a second plurality of virtual hardware components supported by the guest operating system on the virtual machine, based on the additional virtual machine configuration data;
    identifying, in the second plurality of virtual hardware components, a second set of supported virtual hardware components that are not used by the virtual machine; and
    providing, by the virtual machine manager, a second instruction to the hypervisor executing the virtual machine to cause the hypervisor to reconfigure the virtual machine to use a second virtual hardware component from the second set of supported virtual hardware components.

6. The method of claim 1, wherein the set of supported virtual hardware components comprises at least one of virtual hardware components that the virtual machine was previously unable to use or a virtual hardware component that was not supported by the virtual machine prior to an update to the virtual machine configuration data.

7. The method of claim 1, further comprising causing the virtual machine to restart after the virtual machine has been reconfigured to use the at least one virtual hardware component from the set of supported virtual hardware components.

8. The method of claim 1, wherein the plurality of virtual hardware components comprise a sound card.

9. The method of claim 1, wherein the plurality of virtual hardware components comprise a disk controller.

10. An apparatus comprising:
a memory; and
a processing device communicably coupled to the memory, the processing device to:
identify, in view of virtual machine configuration data of a virtual machine executed by the processing device, a plurality of virtual hardware components supported by a guest operating system on the virtual machine;
identify, by a virtual machine manager of a host controller, from the plurality of supported virtual hardware components, a set of supported virtual hardware components that were previously not used by the virtual machine;
generate a user interface comprising the set of supported virtual hardware components that are not used by the virtual machine;
receive, via the user interface, a selection of at least one virtual hardware component from the set of supported virtual hardware components to be initialized on the virtual machine; and
provide, by the virtual machine manager, an instruction to a hypervisor executing the virtual machine to cause the hypervisor to reconfigure the virtual machine by changing a virtual hardware component currently used by the virtual machine to the selected at least one virtual hardware component.

11. The apparatus of claim 10, wherein the plurality of virtual hardware components comprise a sound card.

12. The apparatus of claim 10, wherein the plurality of virtual hardware components comprise a disk controller.

13. The apparatus of claim 10, wherein the processing device is further to:
provide data indicative of the set of supported virtual hardware components to a user; and
receive user input indicating the at least one virtual hardware component.

14. The apparatus of claim 10, wherein the virtual machine configuration data comprises one or more of:
data indicative of an installation of a new guest operating system; data indicative of an update to the guest operating system;
data indicative of an installation of a new software component on the virtual machine; data indicative of an upgrade of an existing software component installed on the virtual machine; or
data indicative of one or more virtual hardware components installed on the virtual machine.

15. The apparatus of claim 10, wherein the processing device to determine the at least one virtual hardware component is performed without user intervention.

16. The apparatus of claim 10, wherein the set of supported virtual hardware components comprises at least one of virtual hardware components that the virtual machine was previously unable to use or a virtual hardware component that was not supported by the virtual machine prior to an update to the virtual machine configuration data.

17. A non-transitory machine-accessible storage medium comprising instructions that when accessed by a processing device, cause the processing device to:
identify, in view of virtual machine configuration data of a virtual machine executed by the processing device, a plurality of virtual hardware components supported by a guest operating system on the virtual machine;
identify, by the processing device of a virtual machine manager of a host controller, from the plurality of supported virtual hardware components, a set of supported virtual hardware components that were previously not used by the virtual machine;
generate a user interface comprising the set of supported virtual hardware components that are not used by the virtual machine;
receive, by the processing device via the user interface, a selection of at least one virtual hardware component from the set of supported virtual hardware components to be initialized on the virtual machine; and
providing, by the virtual machine manager, an instruction to a hypervisor executing the virtual machine to cause the hypervisor to reconfigure the virtual machine by changing a virtual hardware component currently used by the virtual machine to the selected at least one virtual hardware component.

18. The non-transitory machine-accessible storage medium of claim 17, wherein the plurality of virtual hardware components comprise at least one of a sound card or a disk controller.

19. The non-transitory machine-accessible storage medium of claim 17, wherein the processing device is further to:
provide data indicative of the set of supported virtual hardware components to a user; and
receive user input indicating the at least one virtual hardware component.

* * * * *